United States Patent
Zhu et al.

(10) Patent No.: US 12,470,970 B2
(45) Date of Patent: Nov. 11, 2025

(54) SYSTEMS AND METHODS FOR DETERMINING RELIABILITY OF CHANNEL QUALITY MEASUREMENTS PROVIDED BY USER EQUIPMENT

(71) Applicant: Verizon Patent and Licensing Inc., Basking Ridge, NJ (US)

(72) Inventors: Lily Zhu, Parsippany, NJ (US); Jin Yang, Orinda, CA (US); Andrew E. Youtz, Princeton, NJ (US); Susan Wu Sanders, Bridgewater, NJ (US); Yong Sang Cho, Old Tappan, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 340 days.

(21) Appl. No.: 18/345,003

(22) Filed: Jun. 30, 2023

(65) Prior Publication Data
US 2025/0008359 A1    Jan. 2, 2025

(51) Int. Cl.
*H04W 24/10* (2009.01)
*H04W 72/0453* (2023.01)
*H04W 72/1273* (2023.01)
*H04W 72/542* (2023.01)

(52) U.S. Cl.
CPC ....... *H04W 24/10* (2013.01); *H04W 72/0453* (2013.01); *H04W 72/1273* (2013.01); *H04W 72/542* (2023.01)

(58) Field of Classification Search
CPC ............. H04W 24/10; H04W 72/0453; H04W 72/1273; H04W 72/542; H04W 24/08
See application file for complete search history.

(56) References Cited

U.S. PATENT DOCUMENTS

| | | | |
|---|---|---|---|
| 8,958,467 B2 * | 2/2015 | Goransson | H04J 11/004 375/227 |
| 2004/0166887 A1 * | 8/2004 | Laroia | H04B 7/0491 455/69 |
| 2013/0242761 A1 * | 9/2013 | Park | H04B 7/0452 370/252 |
| 2022/0038934 A1 * | 2/2022 | Kumar | H04W 24/10 |

* cited by examiner

*Primary Examiner* — Steven Hieu D Nguyen

(57) ABSTRACT

A system described herein may output, during a particular time window (e.g., in a simulation environment), a series of wireless transmissions to one or more User Equipment ("UEs") of a particular type. The series of wireless transmissions may include first set of transmissions associated with a first set of parameters and a second set of transmissions associated with a second set of parameters. The system may receive channel quality measurements from the one or more UEs, and may identify a measure of variance between the channel quality measurements from the one or more UEs. The system may generate a reliability score associated with the particular type of UE based on the identified measure of variance, and may output, to a wireless network, the reliability score associated with the particular type of UE. The wireless network may communicate with UEs of the particular type based on the reliability score.

20 Claims, 10 Drawing Sheets

301

| Downlink radio resource allocation | UE-reported channel quality |
|---|---|
| High | High |
| Medium | High |
| Low | High |

Low/no variance

| Downlink radio resource allocation | UE-reported channel quality |
|---|---|
| High | Low |
| Medium | High |
| Low | Medium |

High variance

FIG. 3B

SYSTEMS AND METHODS FOR DETERMINING RELIABILITY OF CHANNEL QUALITY MEASUREMENTS PROVIDED BY USER EQUIPMENT

BACKGROUND

Wireless networks provide wireless connectivity to User Equipment ("UEs"), such as mobile telephones, tablets, Internet of Things ("IoT") devices, Machine-to-Machine ("M2M") devices, or the like. Networks may provide wireless coverage according to multiple frequency bands. Some wireless networks may offer Multiple-Input Multiple-Output ("MIMO") connectivity, in which a given band is implemented by multiple antennas or other types of wireless network infrastructure. Networks may implement MIMO configurations or perform other operations based on UE-reported channel quality measurements.

BRIEF DESCRIPTION OF THE DRAWINGS

FIGS. 3A and 3B illustrate example data structures that may be used in accordance with some embodiments

DETAILED DESCRIPTION OF EXAMPLE EMBODIMENTS

The following detailed description refers to the accompanying drawings. The same reference numbers in different drawings may identify the same or similar elements.

Networks may implement MIMO configurations or perform other operations based on UE-reported channel quality metrics. Such channel quality metrics may include, for example, Channel Quality Indicator ("CQI") values, Rank Indicator ("RI") values, Precoding Matrix Indicator ("PMI") values, and/or other types of information that indicate quality, strength, etc. of radio frequency ("RF") signals as transmitted by the network and as received by UEs. For example, if channel quality metrics (e.g., RI values, PMI values, etc.) reported by a set of UEs are above one or more thresholds, the network may implement a MIMO configuration for transmissions to the UEs. If, on the other hand, channel quality metrics reported by a set of UEs are below the one or more thresholds, the network may forgo implementing a MIMO configuration for transmissions to the UEs, and/or may implement a different MIMO configuration than if the channel quality metrics were above the one or more thresholds. As such, the channel quality metrics reported by UEs may play a vital role in the operation of a wireless network.

Situations may arise in which a UE does not accurately report channel quality metrics such as RI values, which may potentially interfere with the operation of a wireless network such as by causing the wireless network to lower its rank assignment, which may cause a loss of network capacity. For example, particular makes, models, etc. of UEs may be misconfigured by a manufacturer or vendor, and/or may otherwise exhibit issues that prevent the accurate determination or reporting of channel quality metrics. Embodiments described herein provide for techniques that identify a measure of reliability with respect to types, groups, etc. of UEs. The measures of reliability may be used to, for example, certify or approve a type of device for use with a wireless network, provide an alert or notification to a manufacturer or vendor of a particular type of UE that the reliability of channel quality measurements by the type of UE is below a threshold measure of reliability, and/or other suitable operations.

Figure 1:
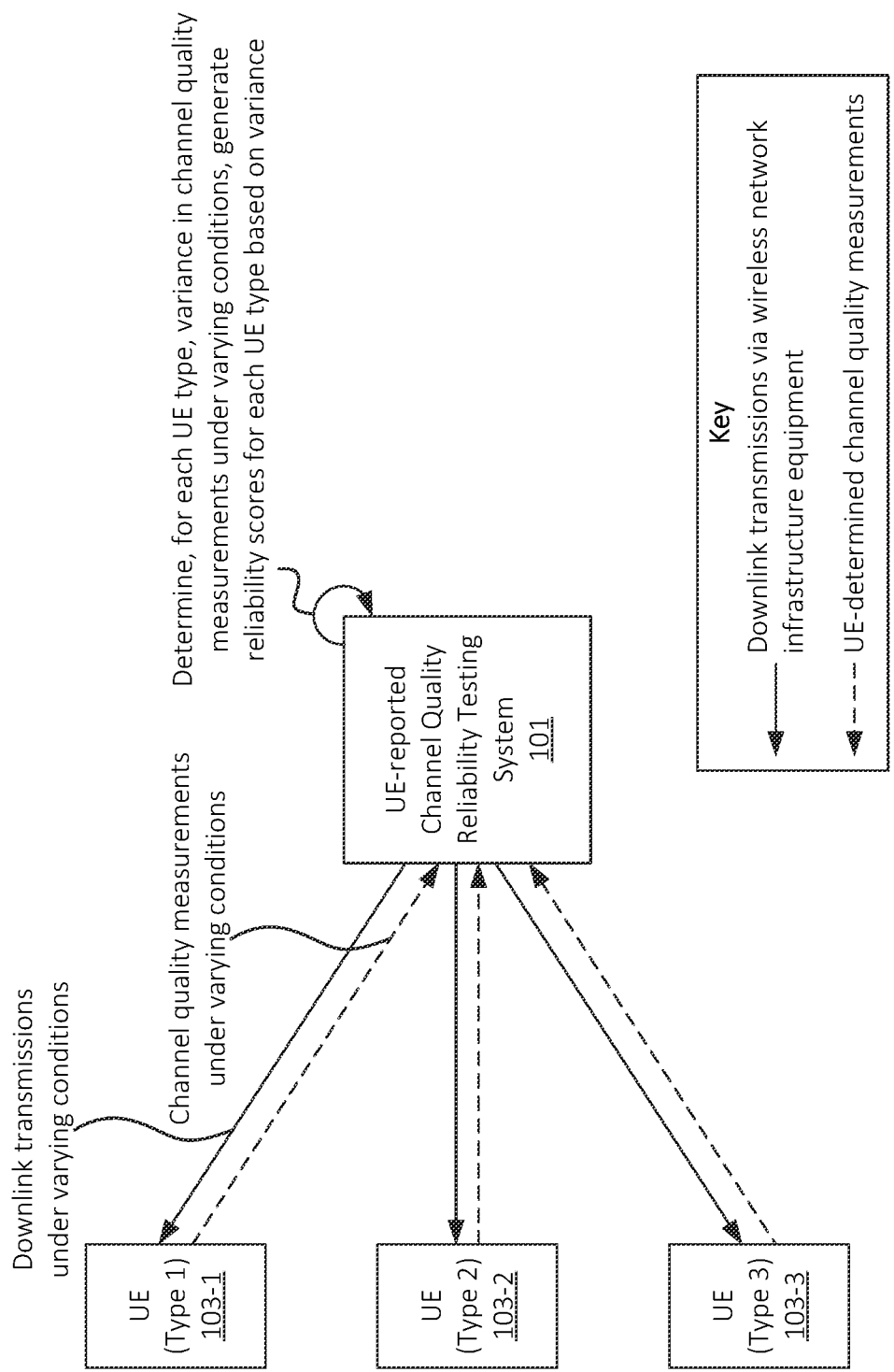
FIG. 1 illustrates an example overview of one or more embodiments described herein.

As shown in FIG. 1, UE-reported Channel Quality Reliability Testing System ("UCQRTS") 101 may cause a series of downlink transmissions to be sent to various UEs 103. For example, such transmissions may be sent via one or more base stations, antennas, or other suitable wireless network infrastructure equipment. In some embodiments, the transmissions may be simulated and/or otherwise made in a controlled or testing environment. For example, the one or more base stations, antennas, etc. may be simulated, and the transmissions to UEs 103 may be simulated. In some embodiments, UEs 103 may be physical UEs, and/or may be implemented in a simulated environment. Thus, in some embodiments, UEs 103 and/or the wireless network infrastructure equipment that outputs transmissions to UEs 103 may be simulated.

In view of the foregoing, operations described below with respect to the transmitting or receiving of RF signals, and/or the determining or reporting of channel quality metrics, may refer to operations that occur in a simulated environment. On the other hand, in some embodiments, the transmitting or receiving of RF signals, and/or the determining or reporting of channel quality metrics, may refer to operations that occur in a real-world environment with physical wireless network infrastructure equipment and/or physical UEs 103.

As shown, UCQRTS 101 may output a series of downlink transmissions to various different UEs 103. The different UEs 103 may include different types of UEs (referred to as "Type 1," "Type 2," and "Type 3"). The different "types" of UEs may refer to different makes and/or models of UEs, UEs with different hardware configurations (e.g., different types or quantities of antennas or other wireless hardware, different battery capacities, different housing materials, etc.), different operating systems, different carrier settings, different classifications or categories (e.g., "first responder," "high data demand," "low data demand," etc.), or other identifiable and/or distinguishing attributes. The series of downlink transmissions may be sent via a set of wireless network infrastructure equipment, such as one or more antennas. In some embodiments, the wireless network infrastructure equipment may implement one or more MIMO configurations, in which multiple antennas are used to implement a single channel or layer.

As discussed above, the transmissions may be sent by real-world, physical wireless network infrastructure equipment to physical UEs 103. In such scenarios, UCQRTS 101 may be communicatively coupled to a controller (e.g., a RAN controller) that causes the downlink transmissions to be wirelessly transmitted by the wireless network infrastructure equipment. In some embodiments, as also noted above, the transmissions may be simulated. For example, UCQRTS 101 may execute one or more simulations in which transmissions from wireless network infrastructure equipment to UEs 103 is simulated. In such scenarios, the wireless network infrastructure equipment and/or UEs 103 may also be simulated, modeled, etc. by UCQRTS 101.

The series of downlink transmissions, sent to each UE 103, may be sent under varying conditions (e.g., simulated conditions) and/or parameters. For example, as discussed below, the downlink transmissions may be sent under varying amounts of downlink radio resource allocations in the time and/or frequency domains (e.g., downlink grants), may be sent with different levels of throughput, different downlink scheduling rates, and/or may have other varying attributes or parameters.

In some embodiments, the downlink transmissions sent to a particular UE 103 may include a first set of downlink transmissions under a first set of downlink radio resource allocations (e.g., the particular UE 103 may be granted a relatively large amount of RF resources in the time and/or frequency domains, such as a relatively large quantity of resource elements ("REs") in the time domain, a relatively large quantity of REs in the frequency domain, and/or a relatively large quantity of REs in both the time and frequency domains). Further, downlink transmissions sent to the particular UE 103 may include a second set of downlink transmissions under a second set of downlink radio resource allocations, in which UE 103 may be granted a relatively small (e.g., lesser than the first set) quantity of REs in the time domain, a relatively small quantity of REs in the frequency domain, and/or a relatively small quantity of REs in both the time and frequency domains. When sending the transmissions to such UE 103 under varying RF resources allocations (e.g., when sending the first and second sets of downlink transmissions), UCQRTS 101 may keep other parameters or factors constant. For example, the location of UE 103 may be kept constant (or within a threshold level of minor variation), the transmit power of the wireless network infrastructure equipment may be kept constant (or within a threshold level of minor variation), and/or other factors that could otherwise potentially affect signal or channel quality may be kept constant (or within a threshold level of minor variation). In this manner, the only substantial variation in the attributes of the wireless network infrastructure equipment and/or UE 103 may be the differences in the amounts of resources allocated to UE 103.

As another example, the downlink transmissions may include varying levels of throughput of traffic sent to UE 103. For example, a first set of downlink transmissions may be sent to UE 103 with a relatively high throughput (e.g., a relatively large amount of traffic may be transmitted to UE 103 within a given timeframe), while a second set of downlink transmissions may be sent to UE 103 with a relatively low (e.g., lesser than the first set) throughput. As similarly noted above, when sending the downlink transmissions to UE 103 with the varying levels of throughput, UCQRTS 101 may keep other configuration parameters or attributes constant, such that only the varying levels of throughput of traffic sent to UE 103 changes. For example, UCQRTS 101 may keep an downlink radio resource allocation, for UE 103, constant while sending traffic with varying levels of throughput to UE 103. In this manner, the only substantial variation in the attributes of the wireless network infrastructure equipment and/or UE 103 may be the differences in the throughput of downlink traffic sent UE 103.

As further shown, each UE 103 may provide, on a periodic or otherwise ongoing basis, channel quality measurements under the varying conditions. For example, UE 103 may generate and/or output CQI values, RI values, PMI values, and/or other types of information that indicate quality, strength, etc. of radio frequency RF signals as transmitted by the network and as received by UE 103. UE 103 may output (or simulate outputting) the channel quality measurements to or via the wireless network infrastructure equipment from which the downlink transmissions were received. In some embodiments, the channel quality measurements may be included in measurement reports or other suitable messages from UEs 103. The timing of the channel quality measurements may be used to associate particular channel quality measurements with parameters of the downlink transmissions sent to UE 103.

For example, during a first time window (e.g., a 15-second time window, a 30-second time window, a 10-minute time window, etc.), UCQRTS 101 may output downlink transmissions to UE 103 under a first set of parameters (e.g., relatively high downlink radio resource allocation, relatively low downlink radio resource allocation, relatively high throughput, relatively low throughput, etc.). During the first time window, UCQRTS 101 may identify that channel quality measurements sent by UE 103 are associated with the first set of parameters. Similarly, during a second time window, UCQRTS 101 may output downlink transmissions to UE 103 under a second set of parameters and may identify that channel quality measurements sent by UE 103, during the second time window, are associated with the second set of parameters. In this manner, UCQRTS 101 may associate particular channel quality measurements, as generated by or received from UEs 103, with particular sets of parameters or conditions under which the channel quality measurements were generated.

As shown, UCQRTS 101 may send downlink transmissions, under varying sets of conditions or parameters, to different types of UEs 103, such as UE 103-1 (e.g., a Type 1 UE), UE 103-2 (e.g., a Type 2 UE), UE 103-3 (e.g., a Type 3 UE), etc. In some embodiments, UCQRTS 101 may send the downlink transmissions to one particular UE of each type (e.g., one instance of UE 103-1, one instance of UE 103-2, and/or one instance of UE 103-3). In some embodiments, UCQRTS 101 may send the downlink transmissions to multiple UEs of each type (e.g., multiple instances of UE 103-1, multiple instances of UE 103-2, multiple instances of UE 103-3, etc.).

UCQRTS 101 may also receive channel quality measurements from UEs 103-1, 103-2, 103-3, etc. As discussed above, UCQRTS 101 may associate particular channel quality measurements, received from each particular UE 103, to conditions or parameters under which downlink transmissions were sent to each particular UE 103. In this manner, UCQRTS 101 may receive or maintain channel quality measurements, that are associated with varying conditions or parameters of downlink transmissions, from multiple different types of UEs 103.

UCQRTS 101 may further determine, for each UE type, a measure of variance in the received channel quality measurements in the varying conditions. For example, for a given UE type, UCQRTS 101 may compare the channel quality measurements, provided by one or more UEs 103 of such UE type, as provided under different conditions or parameters of the downlink transmissions. UCQRTS 101 may further generate one or more scores, metrics, etc. (referred to herein as "reliability scores") for each UE type based on the measure of variance in the received channel quality measurements in the varying conditions. Generally, when the channel quality measurements for a particular UE type exhibit a relatively low (or no) variance under varying conditions or parameters of downlink transmissions, then the particular UE type may be associated with a relatively high measure of reliability with respect to channel quality measurements received by the UE type (e.g., a relatively high reliability score). On the other hand, when the channel quality measurements for a particular UE type exhibit a relatively high (e.g., above a threshold) variance under varying conditions or parameters of downlink transmissions, then the particular UE type may be associated with a relatively low measure of reliability with respect to channel quality measurements received by the UE type (e.g., a relatively low reliability score). That is, the differences in the conditions or parameters of the downlink transmissions would be expected to cause little or no variance in the channel quality measurements from UEs 103.

In some embodiments, one or more other factors may be used in determining the reliability of channel quality measurements from UEs 103. For example, in addition to, or in lieu of the variance of channel quality measurements under differing conditions, the reliability of channel quality measurements from UEs 103 may be determined based on a variance or difference from "known" or "expected" channel quality measurements. For example, even in situations where channel quality measurements from a given UE type exhibit little or no variance from each other, the UE type may still be determined as having a relatively low measure of reliability of the channel quality measurements substantially vary (e.g., by at least a threshold amount or proportion) from a known or expected measure of channel quality under certain conditions.

As one example, assuming that a particular UE type exhibits relatively low variability between channel quality measurements determined under a particular downlink radio resource allocation parameter (e.g., low, medium, high, a sequence or series thereof, etc.), the reliability score for the UE type may still be relatively low if such channel quality measurements substantially differ from a known or expected set of channel quality measurements under the particular downlink radio resource allocation parameter. As another example, assuming that a particular UE type exhibits relatively low variability between channel quality measurements determined under a particular downlink transmission throughput parameter (e.g., low, medium, high, a sequence or series thereof, etc.), the reliability score for the UE type may still be relatively low if such channel quality measurements substantially differ from a known or expected set of channel quality measurements under the particular downlink transmission throughput parameter.

In situations where a given UE type reports varying channel quality measurements under the conditions or parameters of the downlink transmissions provided by UCQRTS 101 (e.g., different channel quality measurements when downlink radio resource allocations are high versus when downlink radio resource allocations are low, different channel quality measurements when measures of throughput are high versus when measures of throughput are low, etc.), such UE type may be determined as being relatively unreliable, and remedial measures may be taken with respect to such UE type.

For example, as discussed above, a vendor, manufacturer, etc. of the particular UE type may be alerted, such that the UE type may be adjusted, redesigned, corrected, or otherwise modified to provide expected results (e.g., little or no variance in reported channel quality measurements under the conditions described above). As another example, a wireless network may be configured to rely less heavily on channel quality measurements from such UE type when operating the network, configurating the network (e.g., configuring MIMO parameters, configuring beamforming parameters, etc.).

Figure 2:
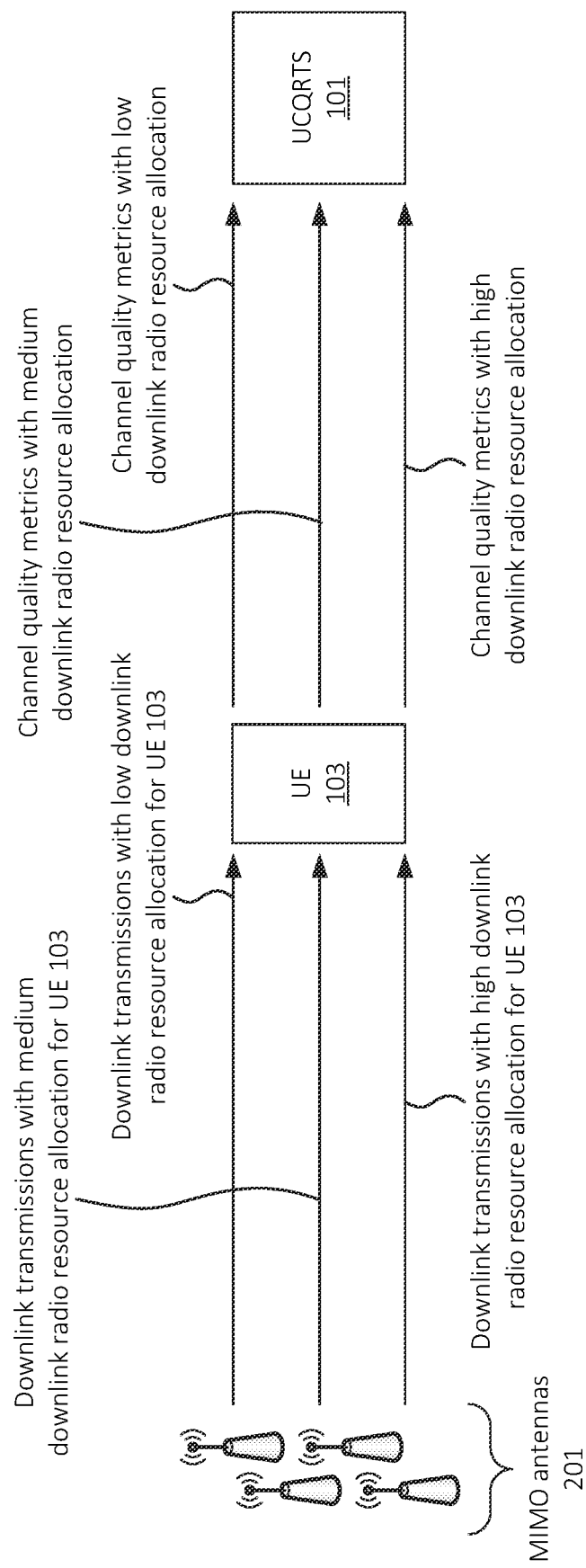
FIG. 2 illustrates an example of a series of transmissions to a UE, which include transmission with variations on a resource allocation parameter, in accordance with some embodiments.

FIG. 2 illustrates an example of varying an downlink radio resource allocation associated with a particular UE type. As shown, for example, a set of wireless network infrastructure equipment (e.g., MIMO antennas 201) may output a first set of downlink transmissions to a particular UE 103, a second set of downlink transmissions, and a third set of downlink transmissions. In some embodiments, while sending the first set of transmissions to UE 103, MIMO antennas 201 may allocate (e.g., grant) a relatively low amount of RF resources for UE 103. For example, a Physical Downlink Shared Channel ("PDSCH") allocated for UE 103 may have a relatively small amount of RF resources (e.g., REs). As discussed above, the relatively small amount of RF resources may be a relatively small quantity of REs in the time domain, the frequency domain, or both. While sending the first set of transmissions to UE 103, MIMO antennas 201 may allocate a medium amount of RF resources for UE 103 (e.g., more REs than were granted for the first set of transmissions). While sending the first set of transmissions to UE 103, MIMO antennas 201 may allocate a relatively high amount of RF resources for UE 103 (e.g., more REs than were granted for the second set of transmissions).

While FIG. 2 illustrates three sets of downlink transmissions, in some embodiments, additional or fewer sets of downlink transmissions may be used. Further, in some embodiments, one set of downlink transmissions may be associated with a relatively low quantity of REs in the time domain, while another set of downlink transmissions may be associated with a relatively low quantity of REs in the frequency domain. For example, one set of downlink transmissions may include multiple REs associated with different frequencies and one time slot, while another set of downlink transmissions may include multiple REs associated with different time slots and one frequency. As another example, one set of downlink transmissions may include multiple REs associated with a first set of frequencies and a first set of time slots, while another set of downlink transmissions may include multiple REs associated with a second set of frequencies and a second set of time slots.

Further, in some embodiments, MIMO antennas 201 may output transmissions to UE 103 under varying sequences of downlink radio resource allocations. The sequence may be random, may be manually determined, may be determined via artificial intelligence/machine learning ("AI/ML") techniques or other automated techniques, etc. For example, the sequence may include allocating a relatively small amount of RF resources (e.g., REs) in the time domain and a relatively large amount of REs in the frequency domain, then subsequently allocating a relatively large amount of REs in the time and frequency domains, then subsequently allocating a medium amount of REs in the time domain and a relatively small amount of REs in the frequency domain, etc. As noted above, these variations are not expected to cause substantial variations in the channel quality metrics reported by UE 103 under such varying conditions.

FIGS. 3A and 3B illustrate example data structures 301 and 303, which may reflect different scenarios (e.g., which may be associated with different UE types) based on varying downlink radio resource allocations. As shown, data structures 301 and 303 include measures of UE-reported channel quality associated with each of a different set of varying network parameters (e.g., downlink radio resource allocations). Data structure 301 may, for example, be associated with one particular UE type while data structure 303 is associated with a different UE type. While data structures 301 and 303 reflect three example varying conditions (e.g., high, medium, and low resource allocations), in practice similar data structures may reflect different sets or sequences of varying conditions, as referred to above.

Data structures 301 and 303 depict channel quality metrics as "high," "medium," and "low" for the sake of explanation. In practice, the channel quality metrics may be indicated as raw measured or reported values (e.g., CQI values, RI values, PMI values, etc.). Additionally, or alternatively, in practice, the channel quality metric may be indicated as a score or other value that is derived from one or more channel quality measurements reported by particular UE types.

In the example of FIG. 3A, a particular UE type may indicate a relatively high channel quality when under the varying downlink radio resource allocations of downlink transmissions to the particular UE type. That is, the particular UE type may indicate the same, or approximately the same (e.g., with relatively low measure of variance), measure of channel quality under high, medium, and low downlink radio resource allocations. As discussed above, this relatively low measure of variance may indicate that this type of UE is relatively reliable with respect to channel quality measurements provided by this type of UE. Accordingly, based on the information depicted in data structure 301, UCQRTS 101 may determine that a corresponding UE type has a relatively high reliability score.

On the other hand, in the example of FIG. 3B, another UE type may indicate differing levels of channel quality under the varying downlink radio resource allocations of downlink transmissions to this UE type. As these channel quality metrics vary by a relatively high amount (e.g., greater than a threshold level of variance or difference), the corresponding UE type may be determined by UCQRTS 101 as relatively unreliable (e.g., associated with a relatively low reliability score).

Figure 4:
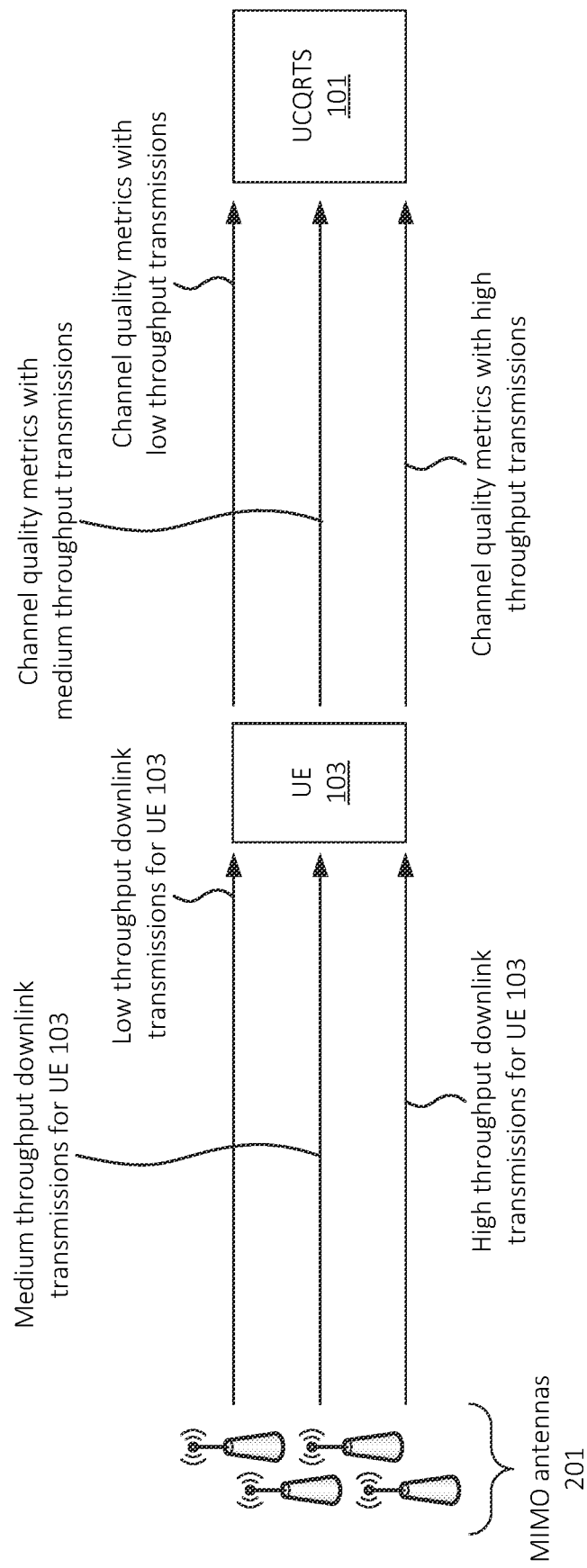
FIG. 4 illustrates an example of a series of transmissions to a UE, which include transmission with variations on a resource allocation parameter, in accordance with some embodiments.

FIG. 4 illustrates an example of determining a reliability score for a particular UE type based on channel quality metrics received from the particular UE type under differing measures of downlink throughput (e.g., differing measures of throughput of traffic sent to one or more UEs 103 of the particular UE type via wireless network infrastructure equipment such as MIMO antennas 201). As shown, UE 103 may receive, from MIMO antennas 201, various sets of downlink transmissions. The sets of downlink transmissions may be sent with varying measures of throughput (e.g., referred to as low, medium, and high). As similarly noted above, the various sets of downlink transmissions may be sent in different sequences, which may be randomized, determined via AI/ML techniques, etc. Further, while three example sets of downlink transmissions are shown in the figure, in practice, UE 103 may receive additional sets of downlink transmissions with additional different measures of downlink throughput.

UCQRTS 101 may receive channel quality metrics from UE 103 (e.g., as measured or otherwise determined by UE 103), and may determine a reliability score for UE 103 based on a measure of variance, difference, variability, etc. between the channel quality metrics. As discussed above, the different measures of downlink throughput of transmissions sent to UE 103 may not be expected to cause any substantial difference in the channel quality metrics determined by UE 103. As such, UE 103 (e.g., the particular type of UE 103) may be associated with a relatively high reliability score when the channel quality metrics do not vary (or vary less than a threshold amount) for the varying throughputs of downlink transmissions to UE 103, while UE 103 may be associated with a relatively low reliability score when such metrics vary (or vary more than the threshold amount).

Figure 5:
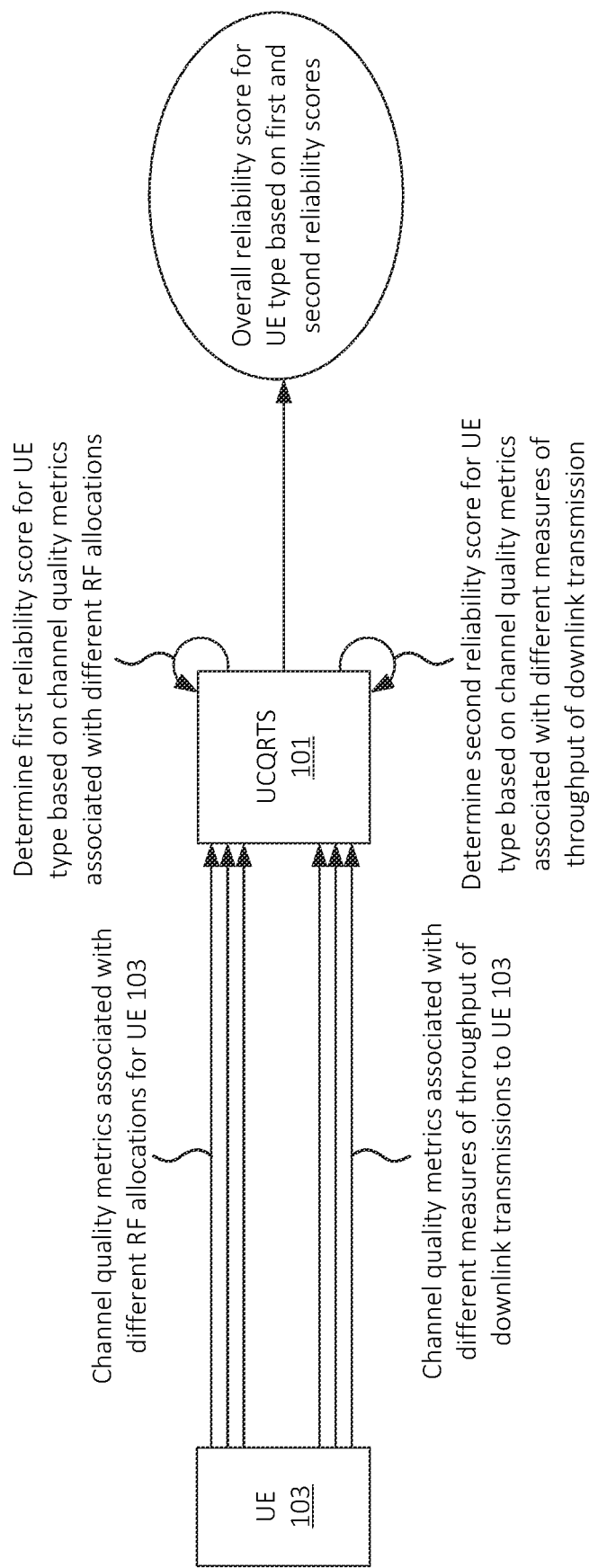
FIG. 5 illustrates an example of generating a reliability score with respect to a UE type based on channel quality measurements received based on variations on different parameters of transmissions to a UE of the UE type, in accordance with some embodiments.
Figure 6:
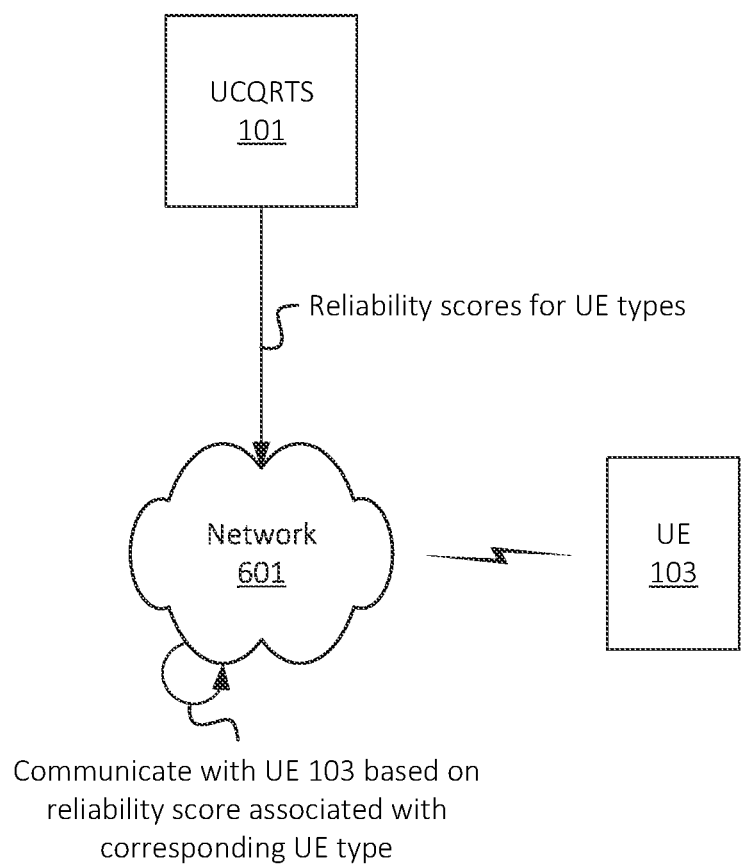
FIG. 6 illustrates an example of modifying a network operation based on a reliability score associated with a given UE type, in accordance with some embodiments.

In some embodiments, as shown in FIG. 5, UCQRTS 101 may generate multiple reliability scores for UE 103 based on different types of variations of network conditions or parameters. For example, as shown, UCQRTS 101 may determine a first reliability score for a given UE type based on a measure of variance in a first set of channel quality metrics reported by one or more UEs 103 of the given UE type under varying downlink radio resource allocations, and may determine a second reliability score for the UE type based on a measure of variance in a second set of channel quality metrics reported by one or more UEs 103 of the given UE type under varying throughputs of downlink transmissions to such UEs 103 of the given UE type.

In some embodiments, UCQRTS 101 may determine an overall reliability score for the UE type based on the first and second reliability scores, and/or based on other factors. In some embodiments, UCQRTS 101 may average the first and second reliability scores, may use the highest or the lowest score out of the first and second reliability scores as the overall reliability score, may more heavily weight the first or second reliability score when determining the overall reliability score, and/or may otherwise determine the overall reliability score based on the first and second reliability scores.

In some embodiments, a particular network 601 may receive the reliability scores, as generated by UCQRTS 101, for one or more UE types. Network 601 may utilize the reliability scores when communicating with one or more UEs 103. For example, during an actual "run time" operation of network 601 and UE 103, network 601 may identify a type of UE 103 (e.g., based on information stored in a UE repository such as a Unified Data Management function ("UDM"), Unified Data Repository ("UDR"), etc.) and may utilize the reliability score associated with the type of UE 103 when coming with UE 103. For example, if the type of UE 103 is associated with a relatively low reliability score, network 601 may not take channel quality measurements from UE 103 into account when determining whether to implement MIMO for transmissions to UE 103, and/or may otherwise less heavily weight or consider channel quality measurements from UE 103 when configuring parameters of network 601. Network 601 may include, for example, one or more RANs that are implemented by wireless network infrastructure equipment such as base stations, radios, antennas, MIMO antennas, etc., the configuration or operation of which may be modified based on whether channel quality measurements from UEs 103 are reliable or not (e.g., based on reliability scores determined in accordance with some embodiments).

Further, as discussed above, one or more other devices, systems, or entities may receive the reliability scores from UCQRTS 101. For example, a manufacturer associated with a particular UE type may receive reliability scores associated with the UE type, and may perform further configuring, testing, development, etc. of the UE type in order to increase the reliability scores associated with the UE type.

Figure 7:
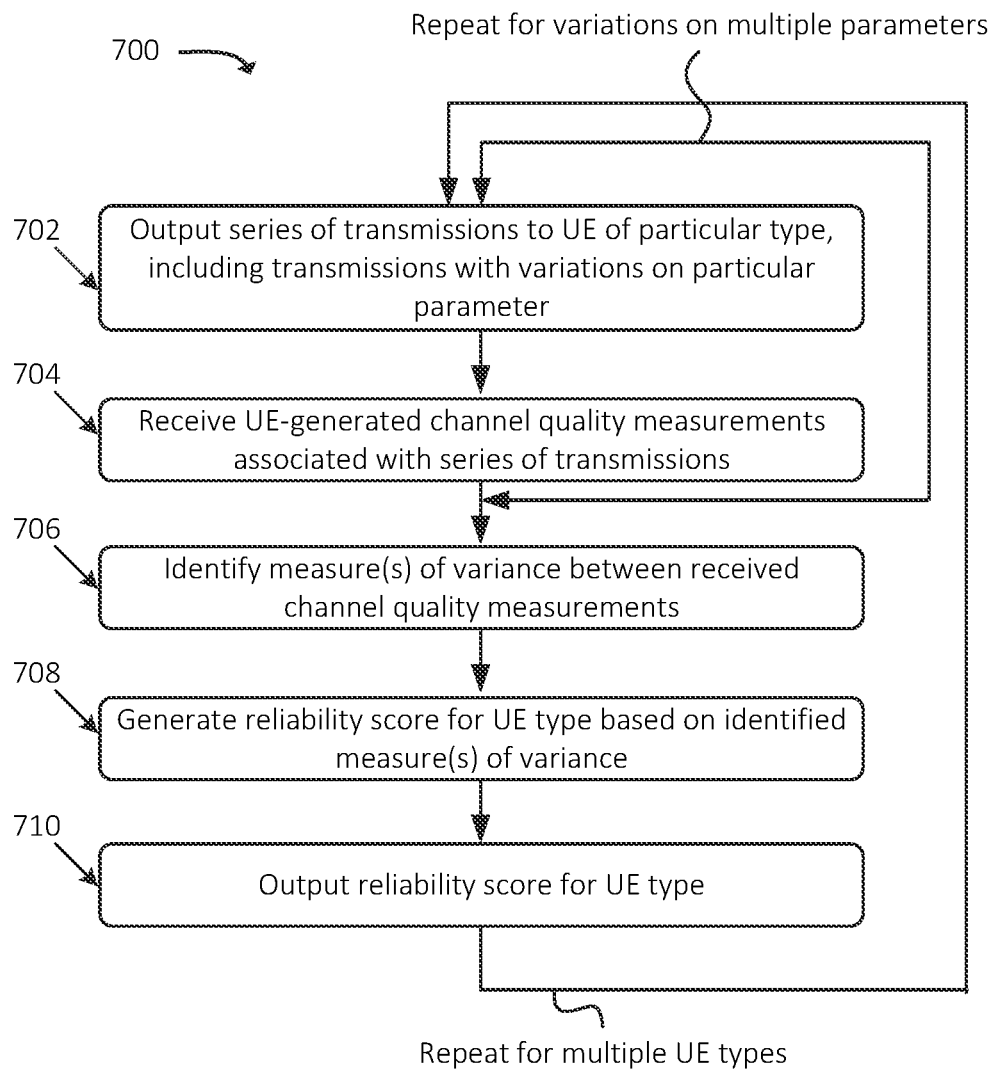
FIG. 7 illustrates an example process for determining a measure of reliability of channel quality measurements associated with a particular UE type, in accordance with some embodiments.

FIG. 7 illustrates an example process 700 for determining a measure of reliability of channel quality measurements associated with a particular UE type. In some embodiments, some or all of process 700 may be performed by UCQRTS 101 (e.g., in a simulated environment, in which wireless network infrastructure equipment, one or more UEs 103, and/or transmissions between the wireless network infrastructure equipment and UEs 103 are simulated). In some embodiments, one or more other devices may perform some or all of process 700 in concert with, and/or in lieu of, UCQRTS 101.

As shown, process 700 may include outputting (at 702) a series of transmissions to one or more UEs 103 of a particular type. The series of transmissions may include transmissions with variations on a particular parameter. For example, as discussed above, the series of transmissions may include a first set of transmissions with a first RF allocation parameter (e.g., a first set of RF resources allocated to UE 103 by the wireless network infrastructure equipment), and a second set of transmissions with a second RF allocation parameter. As another example, the series of transmissions may include a first set of transmissions with a first throughput parameter, and a second set of transmissions with a second throughput parameter.

Process 700 may further include receiving (at 704) UE-generated channel quality measurements associated with the series of transmissions. For example, as discussed above, the series of transmissions may include transmissions associated with particular times or time windows, and the UE-generated channel quality measurements may be received within such time windows and/or otherwise in a manner based on which it may be determined as to which transmission parameters are associated with which UE-generated channel quality measurements. For example, one set of UE-generated channel quality measurements may be associated with a first series of transmissions associated with varying RF allocation parameters, while another set of UE-generated channel quality measurements may be associated with a second series of transmissions associated with varying throughput parameters. As discussed above, the UE-generated channel quality measurements may include CQI values, RI values, PMI values, and/or other suitable channel or signal quality measurements.

Process 700 may additionally include identifying (at 706) one or more measures of variance between the received channel quality measurements. For example, UCQRTS 101 may identify a percentage, proportion, or other suitable measure of variance in the UE-generated channel quality measurements. In some embodiments, UCQRTS 101 may determine a first measure of variance associated with UE-generated channel quality measurements based on variations in a first parameter (e.g., RF allocation parameters) and may determine a second measure of variance associated with UE-generated channel quality measurements based on variations in a second parameter (e.g., throughput parameters).

Process 700 may also include generating (at 708) a reliability score for the UE type based on the identified measure(s) of variance. For example, UCQRTS 101 may determine whether the received channel quality measurements vary by a particular threshold (e.g., a particular percentage, a particular proportion, and/or some other suitable measure of variation). In some embodiments, UCQRTS 101 may generate different scores based on channel quality measurements that are associated with variations on different transmission parameters (e.g., a first score based on a variation in UE-generated channel quality measurements based on varying RF allocation parameters and a second score based on a variation in UE-generated channel quality measurements based on varying throughput parameters). In some embodiments, UCQRTS 101 may generate an overall reliability score for the UE type by averaging, aggregating, or otherwise combining multiple scores.

Process 700 may further include outputting (at 710) the reliability score for the particular type of UE 103. For example, UCQRTS 101 may output the reliability score for the particular type of UE 103 to network 601, which may modify network parameters based on the reliability score, as discussed above. Additionally, or alternatively, UCQRTS 101 may output the reliability score to one or more other devices, systems, or entities, which may modify parameters, attributes, characteristics, etc. of UEs 103 of the particular type, in order to refine or improve the reliability scores of such UEs 103.

Figure 8:
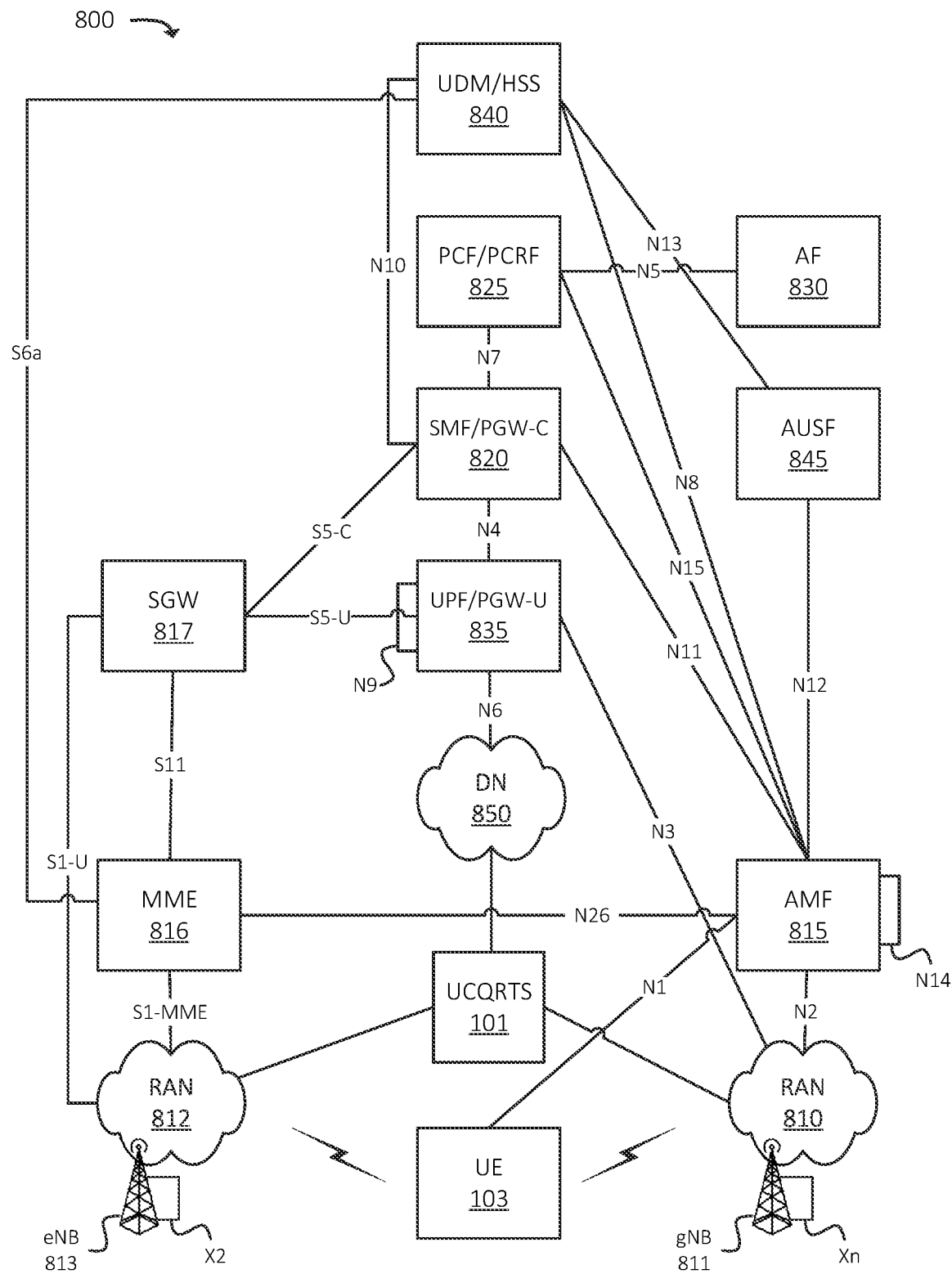
FIG. 8 illustrates example environments in which one or more embodiments, described herein, may be implemented.

FIG. 8 illustrates an example environment 800, in which one or more embodiments may be implemented. In some embodiments, environment 800 may correspond to a Fifth Generation ("5G") network, and/or may include elements of a 5G network. In some embodiments, environment 800 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). In some embodiments, portions of environment 800 may represent or may include a 5G core ("5GC"). As shown, environment 800 may include UE 103, RAN 810 (which may include one or more Next Generation Node Bs ("gNBs") 811), RAN 812 (which may include one or more evolved Node Bs ("eNBs") 813), and various network functions such as Access and Mobility Management Function ("AMF") 815, Mobility Management Entity ("MME") 816, Serving Gateway ("SGW") 817, Session Management Function ("SMF")/Packet Data Network ("PDN") Gateway ("PGW")-Control plane function ("PGW-C") 820, Policy Control Function ("PCF")/Policy Charging and Rules Function ("PCRF") 825, Application Function ("AF") 830, User Plane Function ("UPF")/PGW-User plane function ("PGW-U") 835, Unified Data Management ("UDM")/Home Subscriber Server ("HSS") 840, and Authentication Server Function ("AUSF") 845. Environment 800 may also include one or more networks, such as Data Network ("DN") 850. Environment 800 may include one or more additional devices or systems communicatively coupled to one or more networks (e.g., DN 850), such as UCQRTS 101.

The example shown in FIG. 8 illustrates one instance of each network component or function (e.g., one instance of SMF/PGW-C 820, PCF/PCRF 825, UPF/PGW-U 835, UDM/HSS 840, and/or AUSF 845). In practice, environment 800 may include multiple instances of such components or functions. For example, in some embodiments, environment 800 may include multiple "slices" of a core network, where each slice includes a discrete and/or logical set of network functions (e.g., one slice may include a first instance of AMF 815, SMF/PGW-C 820, PCF/PCRF 825, and/or UPF/PGW-U 835, while another slice may include a second instance of AMF 815, SMF/PGW-C 820, PCF/PCRF 825, and/or UPF/PGW-U 835). The different slices may provide differentiated levels of service, such as service in accordance with different Quality of Service ("QoS") parameters.

The quantity of devices and/or networks, illustrated in FIG. 8, is provided for explanatory purposes only. In practice, environment 800 may include additional devices and/or networks, fewer devices and/or networks, different devices and/or networks, or differently arranged devices and/or networks than illustrated in FIG. 8. For example, while not shown, environment 800 may include devices that facilitate or enable communication between various components shown in environment 800, such as routers, modems, gateways, switches, hubs, etc. In some implementations, one or more devices of environment 800 may be physically integrated in, and/or may be physically attached to, one or more other devices of environment 800. Alternatively, or additionally, one or more of the devices of environment 800 may perform one or more network functions described as being performed by another one or more of the devices of environment 800.

Elements of environment 800 may interconnect with each other and/or other devices via wired connections, wireless connections, or a combination of wired and wireless connections. Examples of interfaces or communication pathways between the elements of environment 800, as shown in FIG. 8, may include an N1 interface, an N2 interface, an N3 interface, an N4 interface, an N5 interface, an N6 interface, an N7 interface, an N8 interface, an N9 interface, an N10 interface, an N11 interface, an N12 interface, an N13 interface, an N14 interface, an N15 interface, an N26 interface, an S1-C interface, an S1-U interface, an S5-C interface, an S5-U interface, an S6a interface, an S11 interface, and/or one or more other interfaces. Such interfaces may include interfaces not explicitly shown in FIG. 8, such as Service-Based Interfaces ("SBIs"), including an Namf interface, an Nudm interface, an Npcf interface, an Nupf interface, an Nnef interface, an Nsmf interface, and/or one or more other SBIs. In some embodiments, environment 800 may be, may include, may be implemented by, and/or may be communicatively coupled to network 601. Additionally, UCQRTS 101 may simulate elements of environment 800, such as wireless network infrastructure equipment (e.g., antennas, radios, etc.) of RAN 810 and/or RAN 812, when simulating downlink transmissions to one or more simulated UEs 103.

UE 103 may include a computation and communication device, such as a wireless mobile communication device that is capable of communicating with RAN 810, RAN 812, and/or DN 850. UE 103 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an Internet of Things ("IoT") device (e.g., a sensor, a smart home appliance, a wearable device, a Machine-to-Machine ("M2M") device, or the like), a Fixed Wireless Access ("FWA") device, or another type of mobile computation and communication device. UE 103 may send traffic to and/or receive traffic (e.g., user plane traffic) from DN 850 via RAN 810, RAN 812, and/or UPF/PGW-U 835.

RAN 810 may be, or may include, a 5G RAN that includes one or more base stations (e.g., one or more gNBs 811), via which UE 103 may communicate with one or more other elements of environment 800. UE 103 may communicate with RAN 810 via an air interface (e.g., as provided by gNB 811). For instance, RAN 810 may receive traffic (e.g., user plane traffic such as voice call traffic, data traffic, messaging traffic, etc.) from UE 103 via the air interface, and may communicate the traffic to UPF/PGW-U 835 and/or one or more other devices or networks. Further, RAN 810 may receive signaling traffic, control plane traffic, etc. from UE 103 via the air interface, and may communicate such signaling traffic, control plane traffic, etc. to AMF 815 and/or one or more other devices or networks. Additionally, RAN 810 may receive traffic intended for UE 103 (e.g., from UPF/PGW-U 835, AMF 815, and/or one or more other devices or networks) and may communicate the traffic to UE 103 via the air interface.

RAN 812 may be, or may include, a LTE RAN that includes one or more base stations (e.g., one or more eNBs 813), via which UE 103 may communicate with one or more other elements of environment 800. UE 103 may communicate with RAN 812 via an air interface (e.g., as provided by eNB 813). For instance, RAN 812 may receive traffic (e.g., user plane traffic such as voice call traffic, data traffic, messaging traffic, signaling traffic, etc.) from UE 103 via the air interface, and may communicate the traffic to UPF/PGW-U 835 (e.g., via SGW 817) and/or one or more other devices or networks. Further, RAN 812 may receive signaling traffic, control plane traffic, etc. from UE 103 via the air interface, and may communicate such signaling traffic, control plane traffic, etc. to MME 816 and/or one or more other devices or networks. Additionally, RAN 812 may receive traffic intended for UE 103 (e.g., from UPF/PGW-U 835, MME 816, SGW 817, and/or one or more other devices or networks) and may communicate the traffic to UE 103 via the air interface.

AMF 815 may include one or more devices, systems, Virtualized Network Functions ("VNFs"), Cloud-Native Network Functions ("CNFs"), etc., that perform operations to register UE 103 with the 5G network, to establish bearer channels associated with a session with UE 103, to hand off UE 103 from the 5G network to another network, to hand off UE 103 from the other network to the 5G network, manage mobility of UE 103 between RANs 810 and/or gNBs 811, and/or to perform other operations. In some embodiments, the 5G network may include multiple AMFs 815, which communicate with each other via the N14 interface (denoted in FIG. 8 by the line marked "N14" originating and terminating at AMF 815).

MME 816 may include one or more devices, systems, VNFs, CNFs, etc., that perform operations to register UE 103 with the EPC, to establish bearer channels associated with a session with UE 103, to hand off UE 103 from the EPC to another network, to hand off UE 103 from another network to the EPC, manage mobility of UE 103 between RANs 812 and/or eNBs 813, and/or to perform other operations.

SGW 817 may include one or more devices, systems, VNFs, CNFs, etc., that aggregate traffic received from one or more eNBs 813 and send the aggregated traffic to an external network or device via UPF/PGW-U 835. Additionally, SGW 817 may aggregate traffic received from one or more UPF/PGW-Us 835 and may send the aggregated traffic to one or more eNBs 813. SGW 817 may operate as an anchor for the user plane during inter-eNB handovers and as an anchor for mobility between different telecommunication networks or RANs (e.g., RANs 810 and 812).

SMF/PGW-C 820 may include one or more devices, systems, VNFs, CNFs, etc., that gather, process, store, and/or provide information in a manner described herein. SMF/PGW-C 820 may, for example, facilitate the establishment of communication sessions on behalf of UE 103. In some embodiments, the establishment of communications sessions may be performed in accordance with one or more policies provided by PCF/PCRF 825.

PCF/PCRF 825 may include one or more devices, systems, VNFs, CNFs, etc., that aggregate information to and from the 5G network and/or other sources. PCF/PCRF 825 may receive information regarding policies and/or subscriptions from one or more sources, such as subscriber databases and/or from one or more users (such as, for example, an administrator associated with PCF/PCRF 825).

AF 830 may include one or more devices, systems, VNFs, CNFs, etc., that receive, store, and/or provide information that may be used in determining parameters (e.g., quality of service parameters, charging parameters, or the like) for certain applications.

UPF/PGW-U 835 may include one or more devices, systems, VNFs, CNFs, etc., that receive, store, and/or provide data (e.g., user plane data). For example, UPF/PGW-U 835 may receive user plane data (e.g., voice call traffic, data traffic, etc.), destined for UE 103, from DN 850, and may forward the user plane data toward UE 103 (e.g., via RAN 810, SMF/PGW-C 820, and/or one or more other devices). In some embodiments, multiple instances of UPF/PGW-U 835 may be deployed (e.g., in different geographical locations), and the delivery of content to UE 103 may be coordinated via the N9 interface (e.g., as denoted in FIG. 8 by the line marked "N9" originating and terminating at UPF/PGW-U 835). Similarly, UPF/PGW-U 835 may receive traffic from UE 103 (e.g., via RAN 810, RAN 812, SMF/PGW-C 820, and/or one or more other devices), and may forward the traffic toward DN 850. In some embodiments, UPF/PGW-U 835 may communicate (e.g., via the N4 interface) with SMF/PGW-C 820, regarding user plane data processed by UPF/PGW-U 835.

UDM/HSS 840 and AUSF 845 may include one or more devices, systems, VNFs, CNFs, etc., that manage, update, and/or store, in one or more memory devices associated with AUSF 845 and/or UDM/HSS 840, profile information associated with a subscriber. AUSF 845 and/or UDM/HSS 840 may perform authentication, authorization, and/or accounting operations associated with the subscriber and/or a communication session with UE 103.

DN 850 may include one or more wired and/or wireless networks. For example, DN 850 may include an Internet Protocol ("IP")-based PDN, a wide area network ("WAN") such as the Internet, a private enterprise network, and/or one or more other networks. UE 103 may communicate, through DN 850, with data servers, other UEs 103, and/or to other servers or applications that are coupled to DN 850. DN 850 may be connected to one or more other networks, such as a public switched telephone network ("PSTN"), a public land mobile network ("PLMN"), and/or another network. DN 850 may be connected to one or more devices, such as content providers, applications, web servers, and/or other devices, with which UE 103 may communicate.

Figure 9:
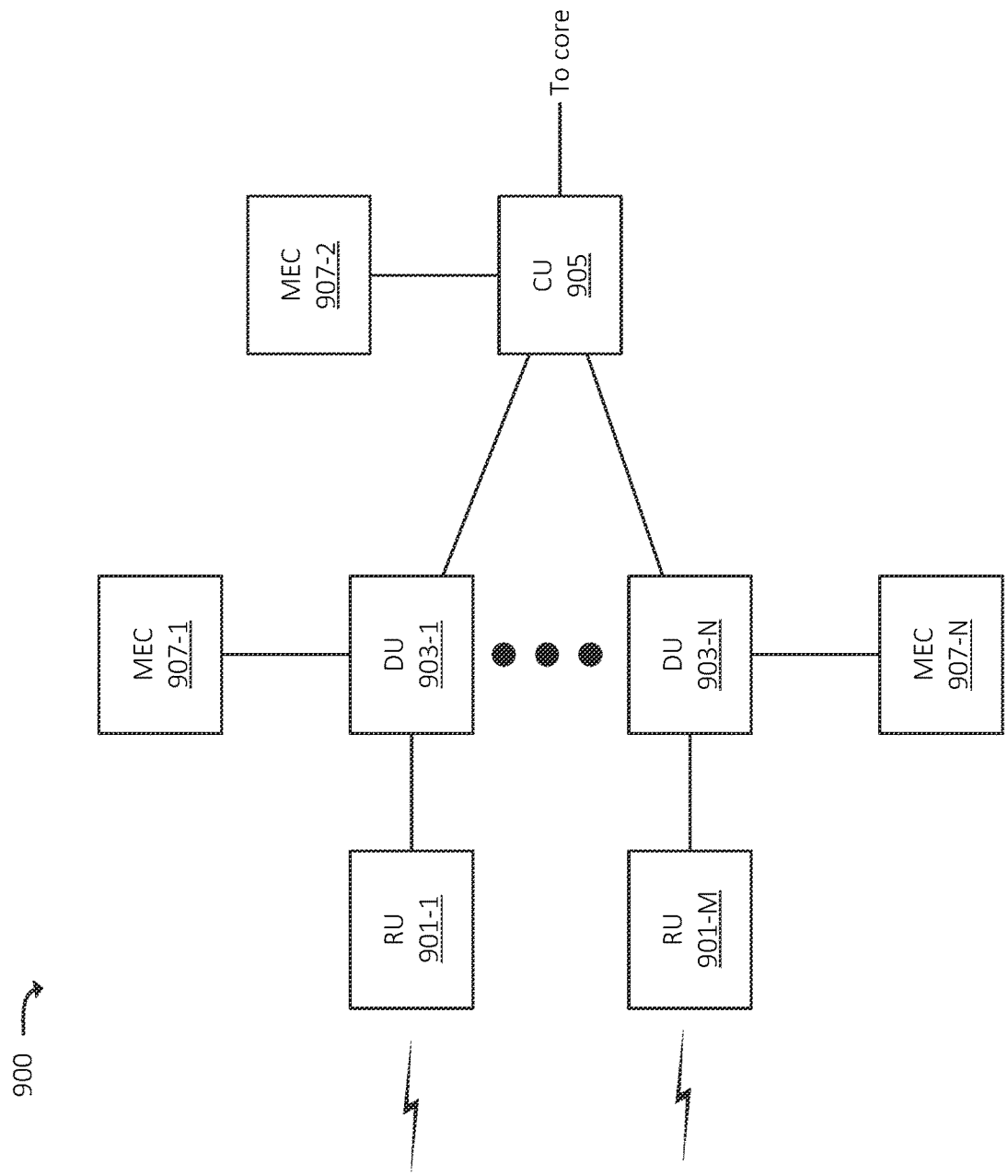
FIG. 9 illustrates an example arrangement of a radio access network ("RAN"), in accordance with some embodiments.

FIG. 9 illustrates an example RAN environment 900, which may be included in and/or implemented by one or more RANs (e.g., RAN 810 or some other RAN). As noted above, one or more elements of RAN environment 900 may be simulated by UCQRTS 101. In some embodiments, a particular RAN 810 may include one RAN environment 900. In some embodiments, a particular RAN 810 may include multiple RAN environments 900. In some embodiments, RAN environment 900 may correspond to a particular gNB 811 of RAN 810. In some embodiments, RAN environment 900 may correspond to multiple gNBs 811. In some embodiments, RAN environment 900 may correspond to one or more other types of base stations of one or more other types of RANs. As shown, RAN environment 900 may include Central Unit ("CU") 905, one or more Distributed Units ("DUs") 903-1 through 903-N (referred to individually as "DU 903," or collectively as "DUs 903"), and one or more Radio Units ("RUs") 901-1 through 901-M (referred to individually as "RU 901," or collectively as "RUs 901").

CU 905 may communicate with a core of a wireless network (e.g., may communicate with one or more of the devices or systems described above with respect to FIG. 8, such as AMF 815 and/or a UPF). In the uplink direction (e.g., for traffic from UEs 103 to a core network), CU 905 may aggregate traffic from DUs 903, and forward the aggregated traffic to the core network. In some embodiments, CU 905 may receive traffic according to a given protocol (e.g., Radio Link Control ("RLC")) from DUs 903, and may perform higher-layer processing (e.g., may aggregate/process RLC packets and generate Packet Data Convergence Protocol ("PDCP") packets based on the RLC packets) on the traffic received from DUs 903.

In accordance with some embodiments, CU 905 may receive downlink traffic (e.g., traffic from the core network) for a particular UE 103, and may determine which DU(s) 903 should receive the downlink traffic. DU 903 may include one or more devices that transmit traffic between a core network (e.g., via CU 905) and UE 103 (e.g., via a respective RU 901). DU 903 may, for example, receive traffic from RU 901 at a first layer (e.g., physical ("PHY") layer traffic, or lower PHY layer traffic), and may process/aggregate the traffic to a second layer (e.g., upper PHY and/or RLC). DU 903 may receive traffic from CU 905 at the second layer, may process the traffic to the first layer, and provide the processed traffic to a respective RU 901 for transmission to UE 103.

RU 901 may include hardware circuitry (e.g., one or more RF transceivers, antennas, radios, and/or other suitable hardware) to communicate wirelessly (e.g., via an RF interface) with one or more UEs 103, one or more other DUs 903 (e.g., via RUs 901 associated with DUs 903), and/or any other suitable type of device. In the uplink direction, RU 901 may receive traffic from UE 103 and/or another DU 903 via the RF interface and may provide the traffic to DU 903. In the downlink direction, RU 901 may receive traffic from DU 903, and may provide the traffic to UE 103 and/or another DU 903.

One or more elements of RAN environment 900 may, in some embodiments, be communicatively coupled to one or more Multi-Access/Mobile Edge Computing ("MEC") devices, referred to sometimes herein simply as a "MECs," 907. For example, DU 903-1 may be communicatively coupled to MEC 907-1, DU 903-N may be communicatively coupled to MEC 907-N, CU 905 may be communicatively coupled to MEC 907-2, and so on. MECs 907 may include hardware resources (e.g., configurable or provisionable hardware resources) that may be configured to provide services and/or otherwise process traffic to and/or from UE 103, via a respective RU 901.

For example, DU 903-1 may route some traffic, from UE 103, to MEC 907-1 instead of to a core network via CU 905. MEC 907-1 may process the traffic, perform one or more computations based on the received traffic, and may provide traffic to UE 103 via RU 901-1. In some embodiments, MEC 907 may include, and/or may implement, some or all of the functionality described above with respect to a UPF, AF 830, and/or one or more other devices, systems, VNFs, CNFs, etc. In this manner, ultra-low latency services may be provided to UE 103, as traffic does not need to traverse DU 903, CU 905, links between DU 903 and CU 905, and an intervening backhaul network between RAN environment 900 and the core network.

Figure 10:
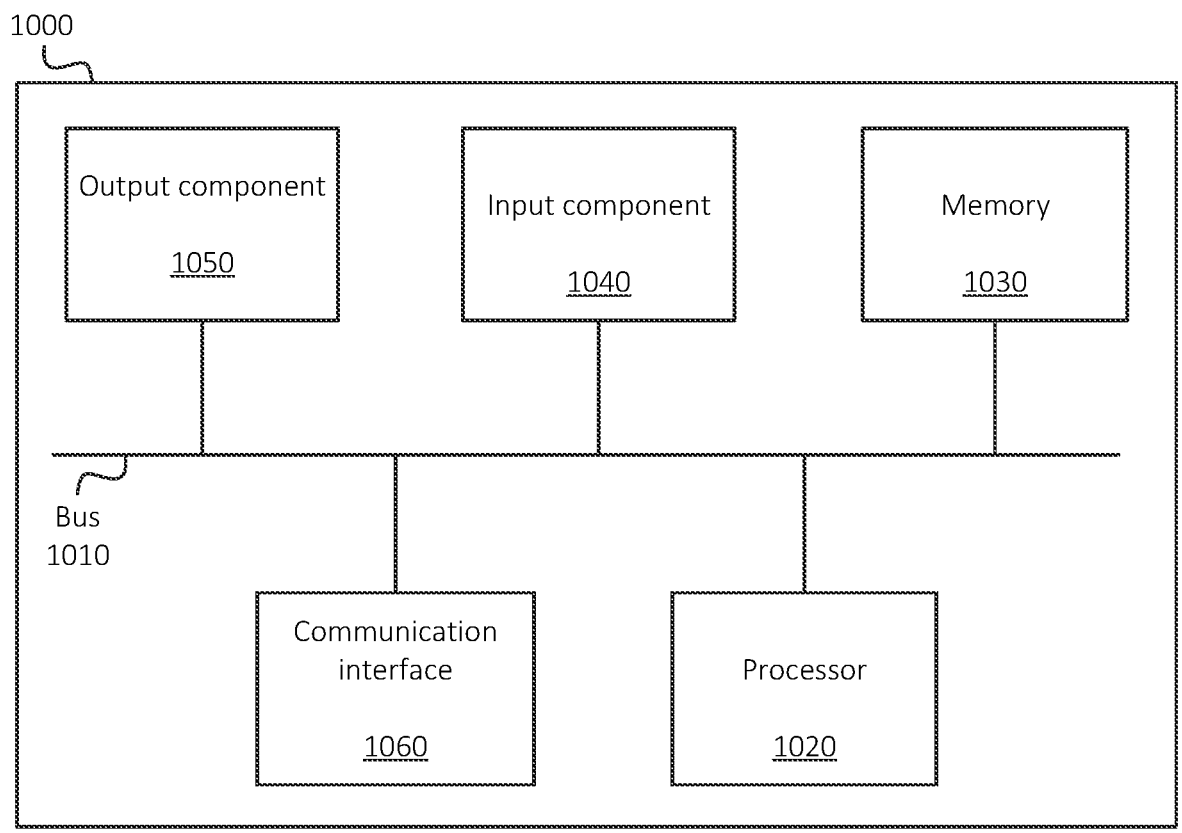
FIG. 10 illustrates example components of one or more devices, in accordance with one or more embodiments described herein.

FIG. 10 illustrates example components of device 1000. One or more of the devices described above may include one or more devices 1000. Device 1000 may include bus 1010, processor 1020, memory 1030, input component 1040, output component 1050, and communication interface 1060. In another implementation, device 1000 may include additional, fewer, different, or differently arranged components.

Bus 1010 may include one or more communication paths that permit communication among the components of device 1000. Processor 1020 may include a processor, microprocessor, or processing logic that may interpret and execute instructions (e.g., processor-executable instructions). In some embodiments, processor 1020 may be or may include one or more hardware processors. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000 and/or other receives or detects input from a source external to input component 1040, such as a touchpad, a touchscreen, a keyboard, a keypad, a button, a switch, a microphone or other audio input component, etc. In some embodiments, input component 1040 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1050 may include a mechanism that outputs information to the operator, such as a display, a speaker, one or more light emitting diodes ("LEDs"), etc.

Communication interface 1060 may include any transceiver-like mechanism that enables device 1000 to communicate with other devices and/or systems. For example, communication interface 1060 may include an Ethernet interface, an optical interface, a coaxial interface, or the like. Communication interface 1060 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1000 may include more than one communication interface 1060. For instance, device 1000 may include an optical interface and an Ethernet interface.

Device 1000 may perform certain operations relating to one or more processes described above. Device 1000 may perform these operations in response to processor 1020 executing instructions, such as software instructions, processor-executable instructions, etc. stored in a computer-readable medium, such as memory 1030. A computer-readable medium may be defined as a non-transitory memory device. A memory device may include space within a single physical memory device or spread across multiple physical memory devices. The instructions may be read into memory 1030 from another computer-readable medium or from another device. The instructions stored in memory 1030 may be processor-executable instructions that cause processor 1020 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-7), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
one or more processors configured to:
output, during a particular time window, a series of wireless transmissions to one or more User Equipment ("UEs") of a particular type, wherein the series of wireless transmissions include:
a first set of transmissions associated with a first set of parameters, and
a second set of transmissions associated with a second set of parameters;
receive, during the particular time window, a plurality of channel quality measurements from the one or more UEs;
identify a measure of variance between the plurality of channel quality measurements from the one or more UEs;
generate a reliability score associated with the particular type of UE based on the identified measure of variance; and
output, to a wireless network, the reliability score associated with the particular type of UE, wherein the wireless network communicates with UEs of the particular type based on the reliability score.

2. The device of claim 1, wherein the first set of parameters includes a first downlink radio resource allocation for the one or more UEs of the particular type, and wherein the second set of parameters includes a second downlink radio resource allocation for the one or more UEs of the particular type.

3. The device of claim 2, wherein the first downlink radio resource allocation includes a first quantity of resource elements ("REs") in a time domain, and wherein the second downlink radio resource allocation includes a second quantity of REs in the time domain.

4. The device of claim 2, wherein the first downlink radio resource allocation includes a first quantity of resource elements ("REs") in a frequency domain, and wherein the second downlink radio resource allocation includes a second quantity of REs in the frequency domain.

5. The device of claim 1, wherein the first set of parameters includes a first measure of throughput of transmissions sent to the one or more UEs, and wherein the second set of parameters includes a second measure of throughput of transmissions sent to the one or more UEs.

6. The device of claim 1, wherein the series of transmissions further include a third set of transmissions and a fourth set of transmissions,
wherein the first set of transmissions and the second set of transmissions include variations on a first parameter,
wherein the third set of transmissions and the fourth set of transmissions include variations on a second parameter.

7. The device of claim 1, wherein the one or more UEs and the series of wireless transmissions are implemented in a simulation environment.

8. A non-transitory computer-readable medium, storing a plurality of processor-executable instructions to:
output, during a particular time window, a series of wireless transmissions to one or more User Equipment ("UEs") of a particular type, wherein the series of wireless transmissions include:
a first set of transmissions associated with a first set of parameters, and
a second set of transmissions associated with a second set of parameters;
receive, during the particular time window, a plurality of channel quality measurements from the one or more UEs;
identify a measure of variance between the plurality of channel quality measurements from the one or more UEs;
generate a reliability score associated with the particular type of UE based on the identified measure of variance; and
output, to a wireless network, the reliability score associated with the particular type of UE, wherein the wireless network communicates with UEs of the particular type based on the reliability score.

9. The non-transitory computer-readable medium of claim 8, wherein the first set of parameters includes a first downlink radio resource allocation for the one or more UEs of the particular type, and wherein the second set of parameters includes a second downlink radio resource allocation for the one or more UEs of the particular type.

10. The non-transitory computer-readable medium of claim 9, wherein the first downlink radio resource allocation includes a first quantity of resource elements ("REs") in a time domain, and wherein the second downlink radio resource allocation includes a second quantity of REs in the time domain.

11. The non-transitory computer-readable medium of claim 9, wherein the first downlink radio resource allocation includes a first quantity of resource elements ("REs") in a frequency domain, and wherein the second downlink radio resource allocation includes a second quantity of REs in the frequency domain.

12. The non-transitory computer-readable medium of claim 8, wherein the first set of parameters includes a first measure of throughput of transmissions sent to the one or more UEs, and wherein the second set of parameters includes a second measure of throughput of transmissions sent to the one or more UEs.

13. The non-transitory computer-readable medium of claim 8, wherein the series of transmissions further include a third set of transmissions and a fourth set of transmissions,
wherein the first set of transmissions and the second set of transmissions include variations on a first parameter, wherein the third set of transmissions and the fourth set of transmissions include variations on a second parameter.

14. The non-transitory computer-readable medium of claim 8, wherein the one or more UEs and the series of wireless transmissions are implemented in a simulation environment.

15. A method, comprising:
  output, during a particular time window, a series of wireless transmissions to one or more User Equipment ("UEs") of a particular type, wherein the series of wireless transmissions include:
    a first set of transmissions associated with a first set of parameters, and
    a second set of transmissions associated with a second set of parameters;
  receive, during the particular time window, a plurality of channel quality measurements from the one or more UEs;
  identify a measure of variance between the plurality of channel quality measurements from the one or more UEs;
  generate a reliability score associated with the particular type of UE based on the identified measure of variance; and
  output, to a wireless network, the reliability score associated with the particular type of UE, wherein the wireless network communicates with UEs of the particular type based on the reliability score.

16. The method of claim 15, wherein the first set of parameters includes a first downlink radio resource allocation for the one or more UEs of the particular type, and wherein the second set of parameters includes a second downlink radio resource allocation for the one or more UEs of the particular type.

17. The method of claim 16, wherein the first downlink radio resource allocation includes a first quantity of resource elements ("REs") in a time domain, and wherein the second downlink radio resource allocation includes a second quantity of REs in the time domain.

18. The method of claim 16, wherein the first downlink radio resource allocation includes a first quantity of resource elements ("REs") in a frequency domain, and wherein the second downlink radio resource allocation includes a second quantity of REs in the frequency domain.

19. The method of claim 15, wherein the first set of parameters includes a first measure of throughput of transmissions sent to the one or more UEs, and wherein the second set of parameters includes a second measure of throughput of transmissions sent to the one or more UEs.

20. The method of claim 15, wherein the series of transmissions further include a third set of transmissions and a fourth set of transmissions,
  wherein the first set of transmissions and the second set of transmissions include variations on a first parameter,
  wherein the third set of transmissions and the fourth set of transmissions include variations on a second parameter.

* * * * *